T. H. WURMB & R. BAUMANN.
SELF RECORDING THERMOMETER.
APPLICATION FILED AUG. 29, 1910.

1,069,594.
Patented Aug. 5, 1913.
4 SHEETS—SHEET 4.

Inventors:
Theodore H. Wurmb.
Robert Baumann.
By Higdon & Longan
attys.

attest.
L. G. Fletcher.
E. L. Wallace.

UNITED STATES PATENT OFFICE.

THEODORE H. WURMB AND ROBERT BAUMANN, OF ST. LOUIS, MISSOURI, ASSIGNORS TO NATIONAL CLOCK & ELECTRIC MANUFACTURING CO., OF ST. LOUIS, MISSOURI, A CORPORATION OF MISSOURI.

SELF-RECORDING THERMOMETER.

1,069,594.     Specification of Letters Patent.     Patented Aug. 5, 1913.

Application filed August 29, 1910.   Serial No. 579,456.

*To all whom it may concern:*

Be it known that we, THEODORE H. WURMB and ROBERT BAUMANN, citizens of the United States, and residents of St. Louis, Missouri, have invented certain new and useful Improvements in Self-Recording Thermometers, of which the following is a specification containing a full, clear, and exact description, reference being had to the accompanying drawings, forming a part hereof.

Our invention relates to improvements in self-recording thermometers and particularly relates to that class of devices employing a revoluble dial timed to move at a uniform speed of travel, a marking device and thermally operated means connected with the marker for moving the same corresponding to the variations in temperature.

The primary object of our invention is to construct a shifting gear-mechanism whereby the recorder may be easily and quickly adapted to change the speed of rotation of the dial-support whereby the dial may be moved at different speeds as required to record either daily or weekly records.

For the above purposes our invention consists in certain novel features of construction and arrangement of parts as will be hereinafter more fully described, pointed out in the claims and illustrated by the accompanying drawings, in which—

Figure 1:
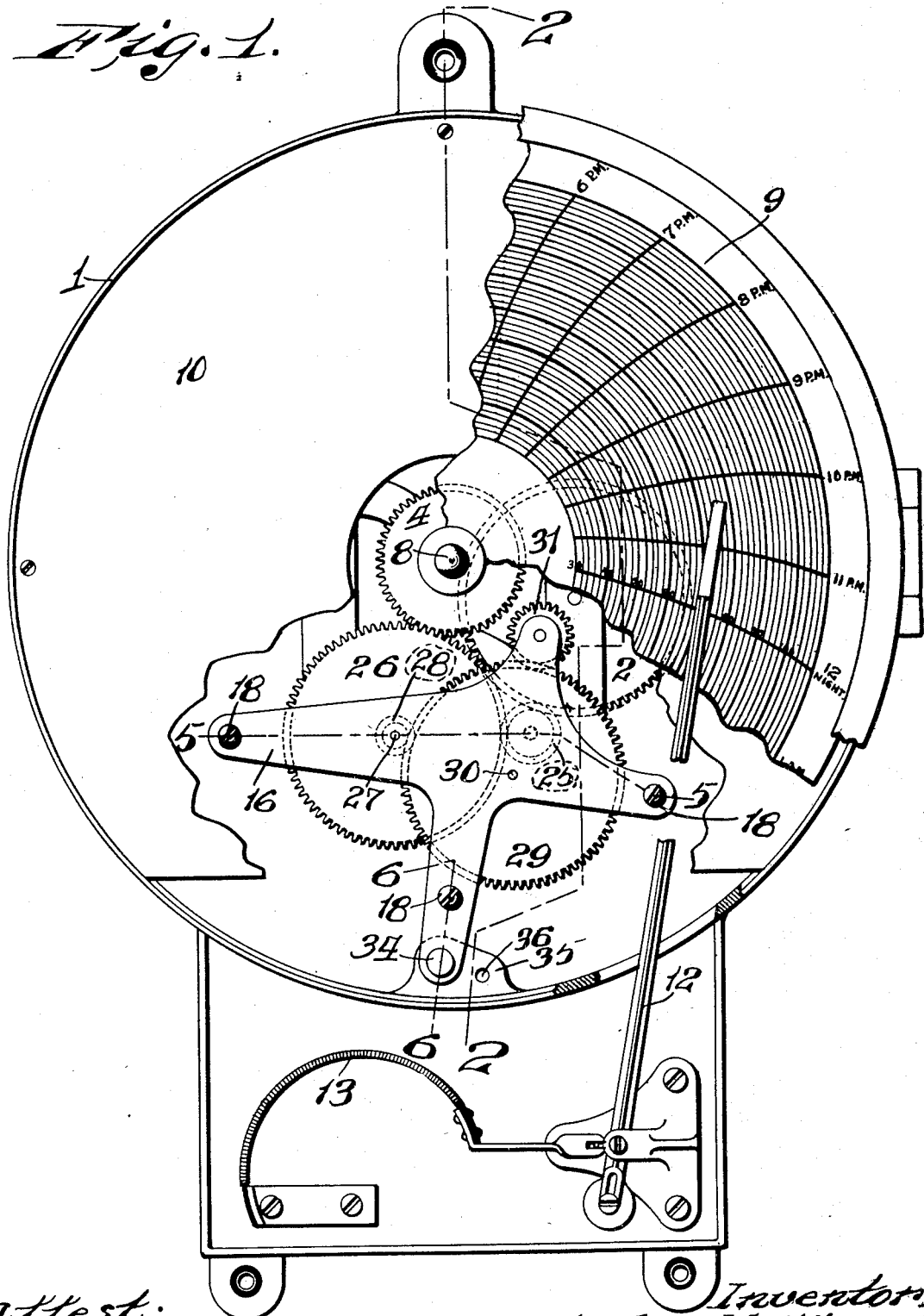
Figure 2:
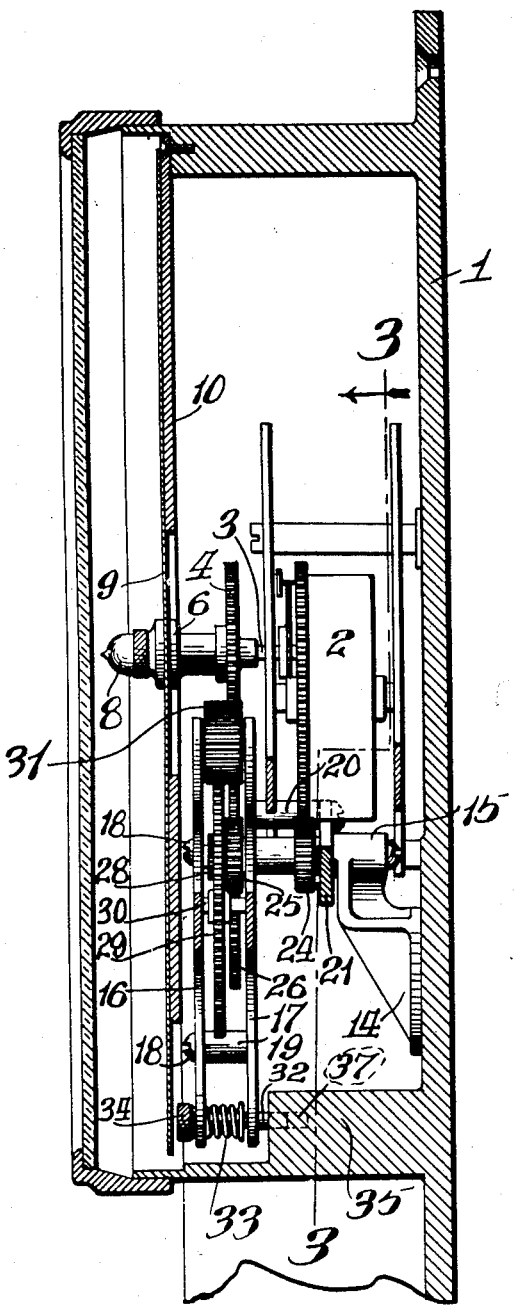
Figure 3:
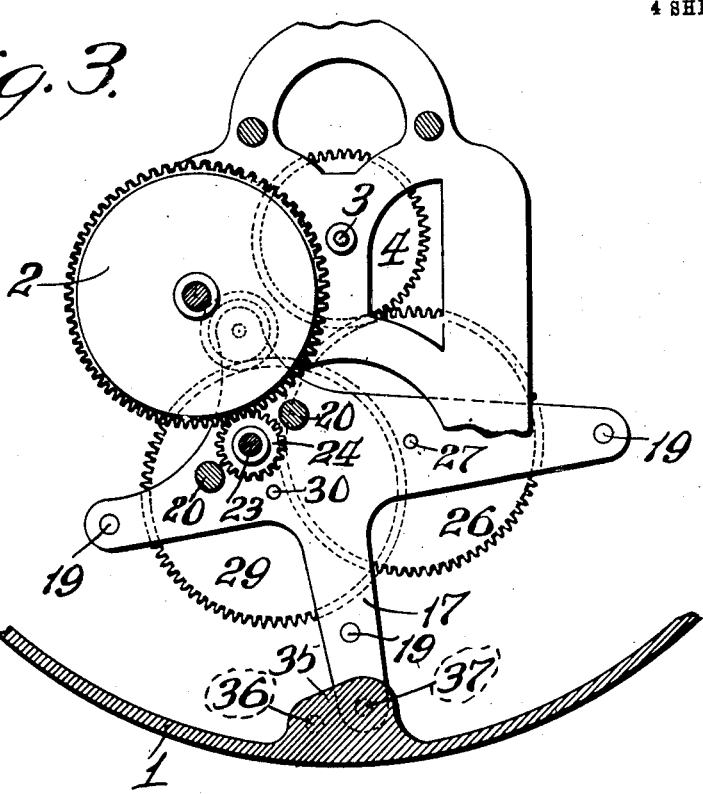
Figure 4:
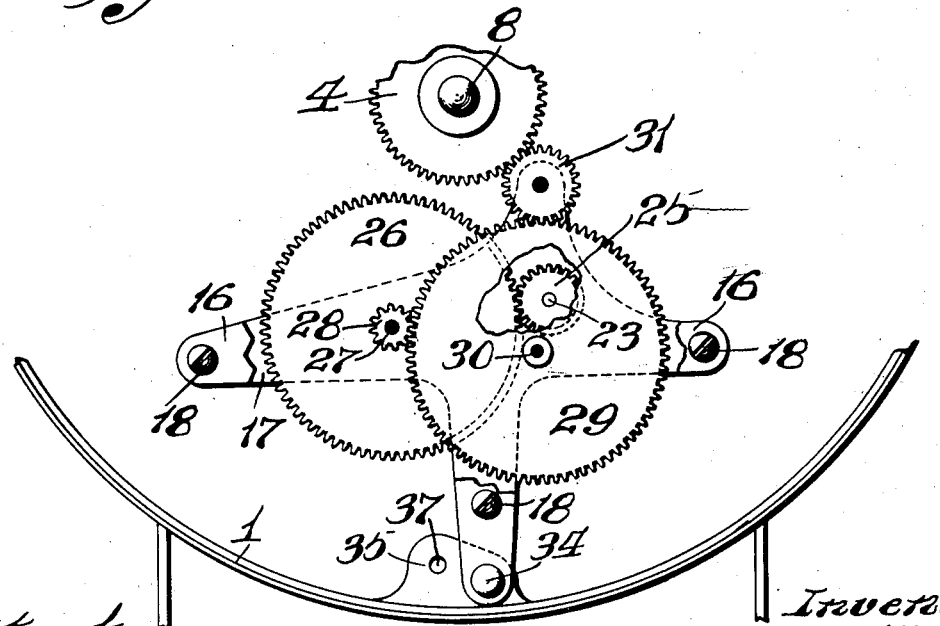
Figure 5:
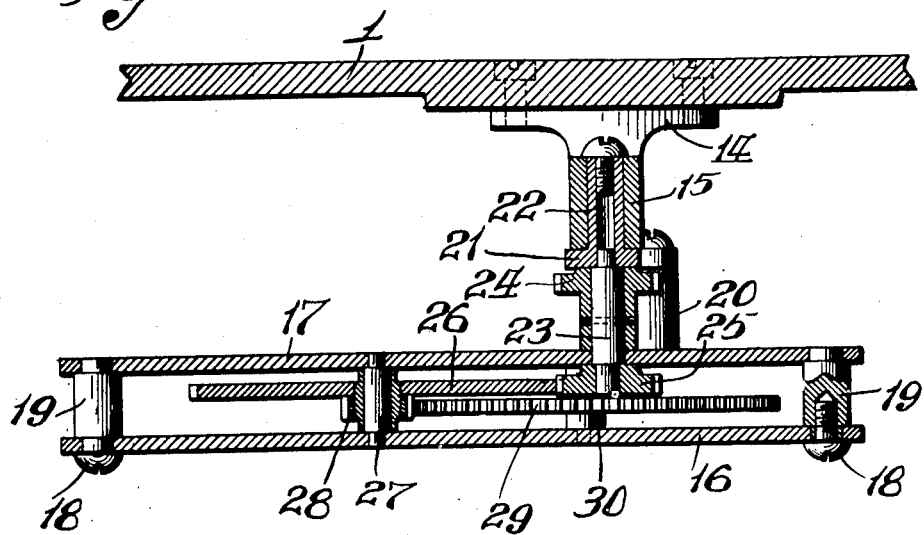
Figure 6:
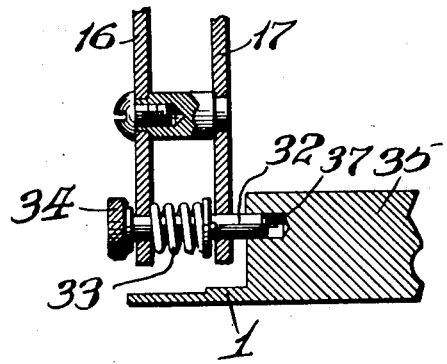
Figure 7:
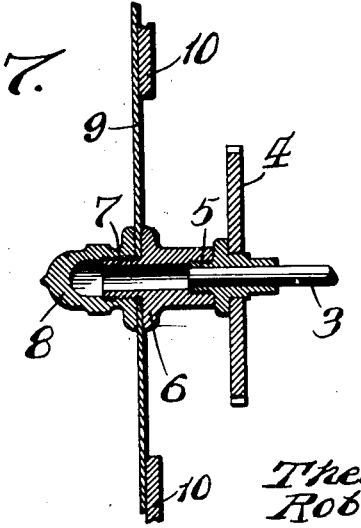

Figure 1 is a front elevation of the complete device parts of the casing, dial and dial-support being broken away; Fig. 2 is a vertical, sectional elevation taken approximately on the line 2—2 of Fig. 1; Fig. 3 is a sectional elevation taken on the line 3—3 of Fig. 2; and illustrates the rear face of the shifting gear; Fig. 4 is a front elevation of the shifting gear, portions being broken away to illustrate otherwise obscured parts; Fig. 5 is a sectional plan taken on the line 5—5 of Fig. 1; Fig. 6 is an enlarged, vertical, sectional detail taken on the line 6—6 of Fig. 1; and Fig. 7 is an enlarged, sectional detail illustrating the manner of mounting the dial and gear wheel for operating the dial.

Referring by numerals to the accompanying drawings: 1 designates the casing.

2 designates the time movement which is preferably of the type known as a "marine movement" or a "double-spring, eight day-lever movement."

The numeral 3 designates the minute hand shaft upon which is mounted to turn free thereon a gear wheel 4, the forward end of the hub 5 of which is threaded to receive and hold in place the flanged collar 6, the forward end 7 of which is reduced and externally threaded to receive the knurled knob 8.

9 designates a record sheet which is centrally apertured and mounted upon the flanged collar 6 and held in place between said flanged collar and the knurled knob 8.

A portion of a record sheet is shown in Fig. 1. The sheet shown is of the ordinary "daily record" type. Other sheets, (not shown) are employed to keep a weekly record of the variations in temperature.

10 designates a plate or backing for the record sheet.

In the lowermost portion of the casing 1 there is pivotally mounted a marking device 12 the upper free end of which is provided with means (not shown) for engagement with the record sheet, which means may be either a pen having a constant source of ink supply, an ordinary graphite pencil or, in some instances, an electric contact point, for making a series of perforations, by sparks, through the record sheet. The marking device is acted upon and moved by a thermo spring 13, which spring is shown and described in our patent granted June 25, 1907, No. 857,709. Secured within the casing beneath the time movement 2 there is a bracket 14 at the upper end of which there is a tubular bearing 15.

16 and 17 designate frame plates which are substantially of the same outline and are held and spaced apart by the bolts 18 and sleeves 19. Projecting rearwardly from the rearmost plate 17 are a pair of posts 20 the outer ends of which support a plate 21, the plate being provided with an integral, tubular journal 22 which is mounted for movement in the bearing 15 of the bracket 14.

Mounted for rotation independently of the movement of the gear frame is a shaft 23 upon which there is mounted for rotation with the shaft a gear wheel 24, which gear wheel is in mesh with the first or largest drive wheel on the right hand side of the time movement.

Mounted on the shaft 23, between the plates of the gear frame, is a gear wheel 25 which meshes with a larger gear wheel 26 supported between the plates of the gear frame, which gear wheel is mounted upon a shaft 27 upon which shaft there is also mounted for rotation with the wheel 26 a smaller gear wheel 28 which meshes with a gear wheel 29 of substantially the same size as the wheel 26 and which wheel is arranged between the plates of the gear frame on the shaft 30.

The gear wheel 29 meshes with a gear wheel 31 which is mounted between the plates of the frame and has a relatively broad face, the gear wheels 26 and 31 being arranged for alternate engagement with the gear wheel 4 for the rotation of the record sheet. When the gear wheel 26 meshes with the wheel 4 the record sheet is turned one revolution in twenty four hours. When the gear wheel 31 meshes with the gear wheel 4 the record sheet is moved one revolution in one week's time, hence the ratio between the gear wheels 26 and 31 is seven to one. Carried by the plates there is a pin 32 which is operated in one direction by a spring 33 provided with a knurled knob 34 for manual operation against the tension of the spring. Formed integral with the casing there is a boss 35 having in its forward face depressions 36 and 37 arranged to coact with said pin 32 to hold the gear frame in different set positions.

In the practical operation of our device, assuming the parts to be assembled as shown and it is desired to keep a daily record of the variations in temperature, the gear frame is shifted to a position bringing the wheel 26 in mesh with the gear wheel 4, then through the train of gear wheels 24, (which receives its motion from the time movement), 25, 26, and 4, it being understood that the marking device is in condition to record by either making a line, or, as previously stated, a series of perforations by electric sparking devices, the marking device being operated by the thermo spring. Now, if it be desired to keep a weekly record of the variations in temperature, the knurled knob 8 is removed, the daily record sheet is removed, and a weekly record sheet is arranged in place and held by the knob 8. It is only necessary now to remove the pin 32 from the depression 37 and rock the gear frame until the wheel 31 meshes with the wheel 4 and seating the pin 32 in the depression 36 to hold the frame so that the wheel 31 is held in mesh with the wheel 4, thereby reducing the speed of travel of the record as compared with the speed of travel for a daily record at a ratio of one to seven or a difference between twenty four hours and one week's time.

We claim:

1. In a self-recording thermometer, a time movement, a revoluble support arranged to receive interchangeable record sheets, a gear device operated by said time movement, a gear device secured to said revoluble support, a rocking frame, a train of gear devices carried by said rocking frame, and means whereby the rocking frame may be held in different set positions, as required to change the ratio of speed between the time movement and the revoluble support.

2. In a self-recording thermometer, a time movement, a revoluble support arranged to receive interchangeable record sheets, a gear device operated by said time movement, a gear device secured to said revoluble support, a rocking frame, a train of gear devices carried by said rocking frame, an arm carried by said rocking frame, a spring-actuated locking device carried by said arm, and a fixed element in the path of travel of said arm arranged to coöperate with said spring-actuated locking device for holding the rocking frame in different set positions, substantially as shown and for the purposes stated.

In testimony whereof, we have signed our names to this specification, in presence of two subscribing witnesses.

THEODORE H. WURMB.
ROBERT BAUMANN.

Witnesses:
  E. L. WALLACE,
  N. G. BUTLER.